(12) United States Patent
Kurata (10) Patent No.: US 11,842,104 B2
(45) Date of Patent: Dec. 12, 2023

(54) PRINTING APPARATUS AND STORAGE MEDIUM FOR RECEIVING INPUT AUTHENTICATION INFORMATION

(71) Applicant: CANON KABUSHIKI KAISHA, Tokyo (JP)

(72) Inventor: Yasuo Kurata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/746,739

(22) Filed: May 17, 2022

(65) Prior Publication Data
US 2022/0374183 A1  Nov. 24, 2022

(30) Foreign Application Priority Data
May 21, 2021 (JP) .................................. 2021-086092

(51) Int. Cl.
G06F 3/12 (2006.01)

(52) U.S. Cl.
CPC .......... *G06F 3/1238* (2013.01); *G06F 3/1205* (2013.01); *G06F 3/1251* (2013.01)

(58) Field of Classification Search
CPC ..... G06F 3/1238; G06F 3/1205; G06F 3/1251
USPC ....................................................... 358/1.15
See application file for complete search history.

(56) References Cited

U.S. PATENT DOCUMENTS

| 2018/0152973 A1* | 5/2018 | Ueno | ..................... H04W 76/11 |
| 2019/0236032 A1* | 8/2019 | Isozaki | ................. G06F 3/0658 |

FOREIGN PATENT DOCUMENTS

JP          2007087373 A        4/2007

* cited by examiner

*Primary Examiner* — Allen H Nguyen
(74) *Attorney, Agent, or Firm* — Canon U.S.A., Inc. IP Division (57) ABSTRACT

A printing apparatus includes a data reception unit configured to receive print data and authentication information from an information processing apparatus outside the printing apparatus, an input reception unit configured to receive input of the authentication information from a user, a printing unit configured to perform printing based on the print data; and a control unit configured to control a cut unit configured to cut a print medium. The printing unit performs predetermined printing based on the print data, based on received authentication information and the input authentication information. The control unit causes the cut unit to cut the print medium including a portion where the predetermined printing has been performed, based on received authentication information and the authentication information input after start of the predetermined printing.

9 Claims, 13 Drawing Sheets

| PIN PRINT JOB LIST |
|---|
| JobNameA |
| JobNameB ~S1201 |
| JobNameC |
| JobNameD S1202 |

| PRINT | CANCEL |

FIG.13

PRINTING APPARATUS AND STORAGE MEDIUM FOR RECEIVING INPUT AUTHENTICATION INFORMATION

BACKGROUND

Field of the Disclosure

The present disclosure relates to a printing apparatus and a storage medium.

Description of the Related Art

In known techniques, some printing apparatuses perform printing only in a case where it is determined that a user who has transmitted a print job to the printing apparatus performs the printing of the print job, in order to prevent a printed document from being carried away by a third party or from being lost (Japanese Patent Application Laid-Open No. 2007-087373). For example, Japanese Patent Application Laid-Open No. 2007-087373 discusses providing a mechanism in which, in a case of printing which requires a time for completion, a discharge tray of the printing apparatus is locked and can be unlocked only by the user who has issued the print instruction.

In a case where the mechanism in which the discharge tray of the printing apparatus is locked and can be unlocked only by the user who has issued the print instruction is provided as discussed in Japanese Patent Application Laid-Open No. 2007-087373, large-scale hardware extension is necessary for the printing apparatus itself. This causes issues such as mechanical failure risk and increase in cost caused by increase in the number of parts.

SUMMARY

Embodiments of the present disclosure are directed to improvement of usability at printing such as large-format printing without requiring large-scale hardware extension in the printing apparatus itself.

According to embodiments of the present disclosure, a printing apparatus includes a data reception unit configured to receive print data and authentication information from an information processing apparatus outside the printing apparatus, an input reception unit configured to receive input of the authentication information from a user, a printing unit configured to perform printing based on the print data, and a control unit configured to control a cut unit configured to cut a print medium. The printing unit performs predetermined printing based on the print data, based on received authentication information and the input authentication information. The control unit causes the cut unit to cut the print medium including a portion where the predetermined printing has been performed, based on received authentication information and the authentication information input after start of the predetermined printing.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to drawings. The exemplary embodiments described below do not limit the present disclosure, and all of combinations of features described in the exemplary embodiments are not necessarily deemed to be essential. In the accompanying drawings, the same or similar components are denoted by the same reference numerals, and repetitive descriptions are omitted.

Figure 1:
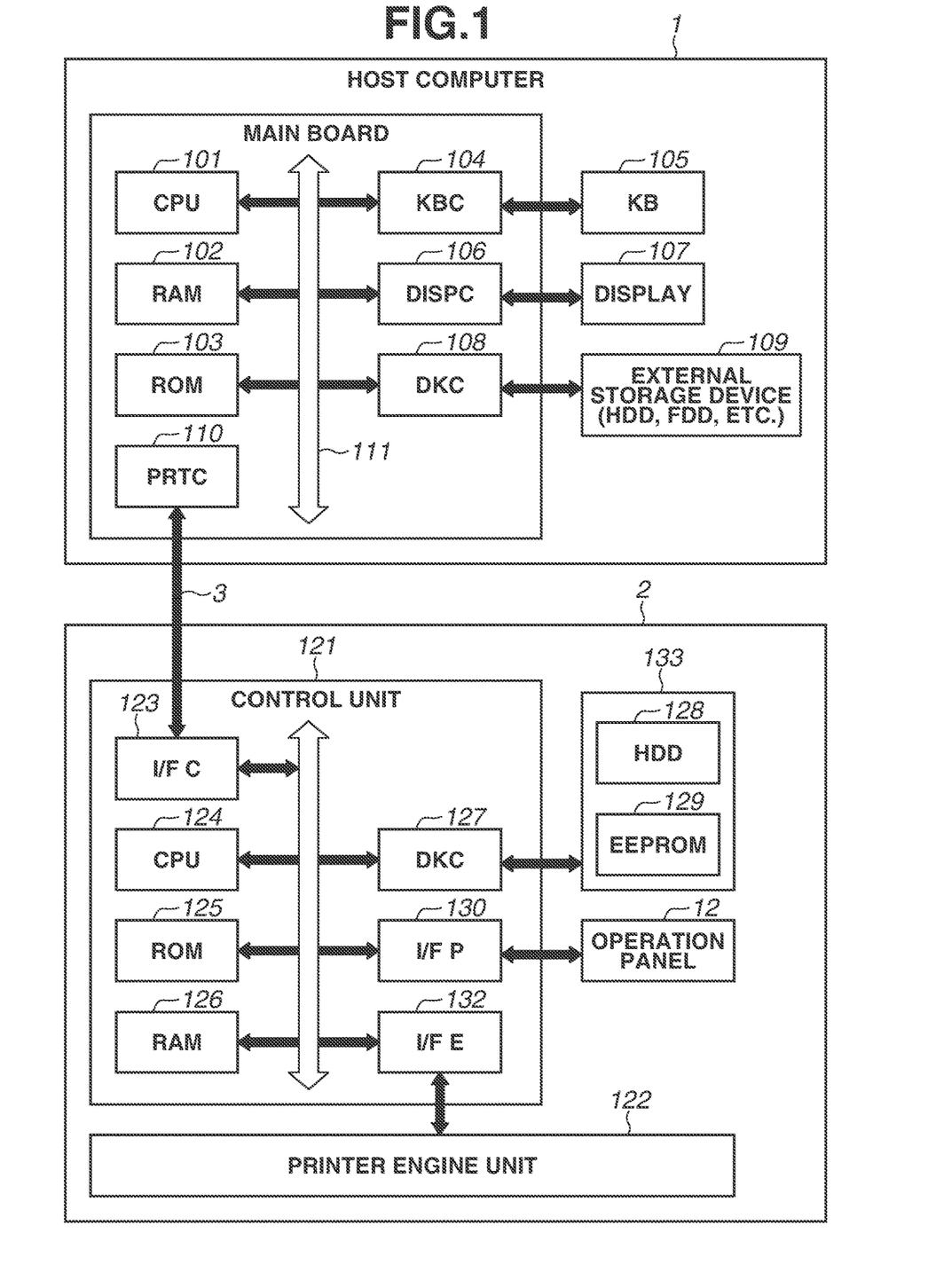
FIG. 1 is a diagram illustrating a hardware configuration of a system.

A first exemplary embodiment of the present disclosure will be described below. FIG. 1 is a diagram illustrating a hardware configuration of a system according to the present exemplary embodiment. The system according to the present exemplary embodiment includes a host computer (hereinafter, also referred to as host) 1 as an information processing apparatus, and a printing apparatus (printer) 2.

In the printing system illustrated in FIG. 1, the printer 2 is wirelessly connected to the host 1 through a bidirectional interface 3 (e.g., universal serial bus (USB) or transmission control protocol/internet protocol (TCP/IP)). These apparatuses are communicable, and a communication method used for connection between the apparatuses is, for example, an Institute of Electrical and Electronics Engineers (IEEE) 802.11 series communication standard (Wi-Fi) or Bluetooth® (e.g., Bluetooth® Classic or Bluetooth® Low Energy). In the printing system, direct connection may not be performed. More specifically, for example, each of the apparatuses may be connected to an access point, such as a wireless local area network (LAN) router and a base station, through Wi-Fi or mobile telecommunications (third generation (3G), fourth generation (4G), or fifth generation (5G)), and communication between the apparatuses may be performed by Internet communication through the access point.

The host computer 1 is, for example, a personal computer (PC). The host computer 1, however, is not limited thereto, and various apparatuses, such as a smartphone and a digital camera, may be adopted as the host computer 1 according to the present exemplary embodiment. A printing method of the printer 2 used in the present exemplary embodiment may be an electrophotographic method, an inkjet method, or other methods.

A central processing unit (CPU) 101 generally controls the above-described components connected to a system bus 111, and executes various programs. A keyboard controller (KBC) 104 controls input from a keyboard 105 and a pointing device (not illustrated). The keyboard controller 104 is also referred to as an operation unit or an input unit. A display controller (DISPC) 106 controls display of a display 107. A random access memory (RAM) 102 functions as a main memory or a work area for the CPU 101. A read only memory (ROM) 103 stores an operating system, various programs according to the exemplary embodiment described below, a boot program, various applications, a printer control command generation program (hereinafter, printer driver), and the like. A disk controller (DKC) 108 controls access to an external storage device 109, such as a hard disk and a flexible disc (registered trademark). A printer controller (PRTC) 110 is connected to the printer 2 through the bidirectional interface 3, and controls communication processing of print data with the printer 2.

The printer 2 includes a control unit 121, a printer engine unit (engine unit) 122, an operation panel (display unit) 12, and a nonvolatile storage device 133, and is connected to the host 1 through the bidirectional interface 3. The nonvolatile storage device 133 includes a hard disk drive (HDD) 128 or an electrically erasable programmable read only memory (EEPROM) 129. The nonvolatile storage device is also referred to as a nonvolatile memory in some cases. The control unit 121 includes a CPU 124, a ROM 125, a RAM 126, an interface controller (I/FC) 123, a disk controller (DKC) 127, a panel interface (I/FP) 130, and an engine interface (I/FE) 132. The CPU 124 executes various programs. The ROM 125 receives print data from the host 1, and controls the printer engine unit 122 to store programs for realizing optimum recording and various data. The RAM 126 is used as a work area temporarily storing various data and various programs. The interface controller (I/FC) 123 is connected to the host 1 through the bidirectional interface 3, and controls processing of communicating print data with the host 1. The HDD 128 stores a large capacity of data, such as data from the host 1 and attachment information relating to the data. The EEPROM 129 stores unique information about the nonvolatile storage device 133 used in recording operation. The disk controller (DKC) 127 controls access to the nonvolatile storage device 133. The panel interface (I/FP) 130 controls display on the operation panel 12 and input from the operation panel 12. The engine interface (I/FE) 132 controls the printer engine unit 122 that directly controls hardware to realize optimum recording.

The printer 2 according to the present exemplary embodiment is an apparatus that performs printing (output) on a print medium (roll sheet), includes a print medium cut function of cutting off the print medium after printing, and performs cut processing to enable a user to take out a printed document.

Figure 2:
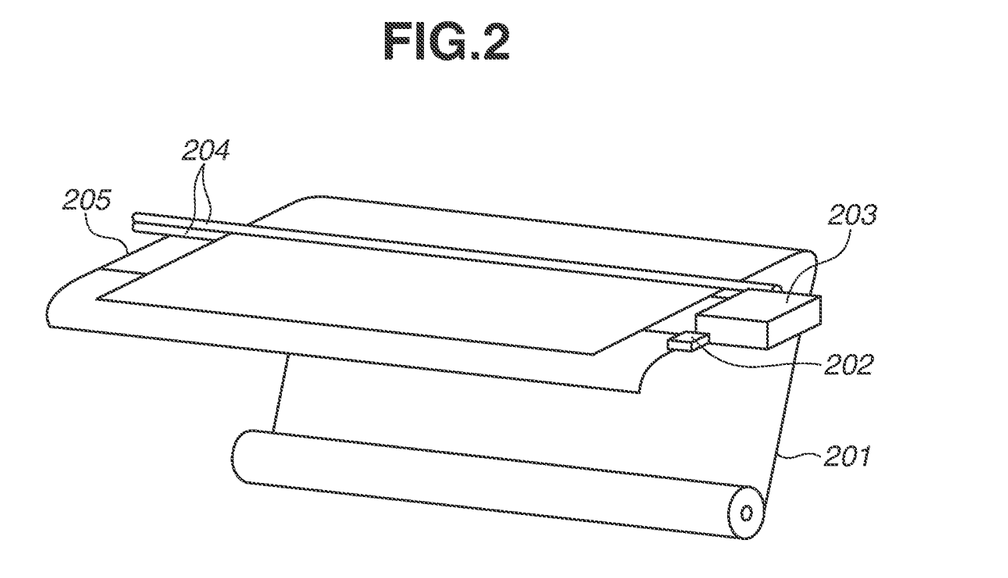
FIG. 2 is a schematic diagram illustrating a state where a sheet is attached to a printing apparatus.

FIG. 2 is a schematic diagram illustrating a state where a sheet is attached to the printer 2 according to the present exemplary embodiment. The printer 2 includes a cutter unit 202, a carriage 203, conveyance rollers 204, and a platen 205.

A print medium 201, which is a recording sheet, is sandwiched between the conveyance rollers 204, and is fed or wound up by rotation of the conveyance rollers 204. The print medium 201 is supported from below by the platen 205.

The carriage 203 includes a recording head (not illustrated), and the recording head ejects ink to perform printing on the print medium 201. The carriage 203 may include an ink tank storing the ink to be supplied to the recording head. The carriage 203 reciprocates from a right side to a left side and from the left side to the right side in FIG. 2.

Figure 3:
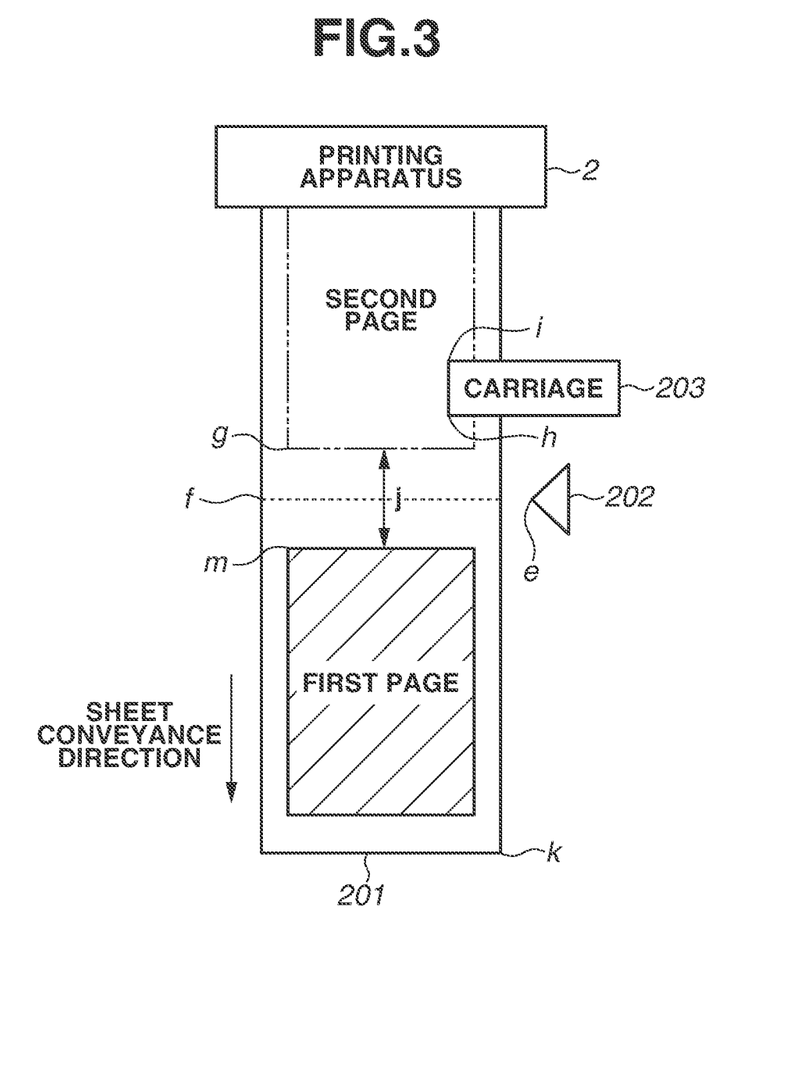
FIG. 3 is a schematic diagram illustrating a cut position of a print medium.

FIG. 3 is a schematic diagram illustrating a cut position of the print medium according to the present exemplary embodiment. After printing of a first page ends, the print medium 201 is discharged from the printer 2, and the carriage 203 is positioned on a second page. The cutter unit 202 is positioned on a downstream of the carriage 203. A position e is a position of a cutter, a position f is a leading edge position of the second page (on upstream in conveyance direction of first page, i.e., cut position), a position g is a print start position of the second page, a position h is a most-downstream nozzle position of the carriage 203, and a position i is a most-upstream nozzle position of the carriage 203. Further, a distance j is a margin between the first page and the second page, a position k is a leading edge position of the print medium 201, and a position m is a print end position of the first page.

The cutter unit 202 cuts the print medium 201 at the position f that is a boundary between the first page which is printed and the second page which is not yet printed while moving from the right side (side on which carriage 203 is illustrated) to the left side in FIG. 3.

Figure 4:
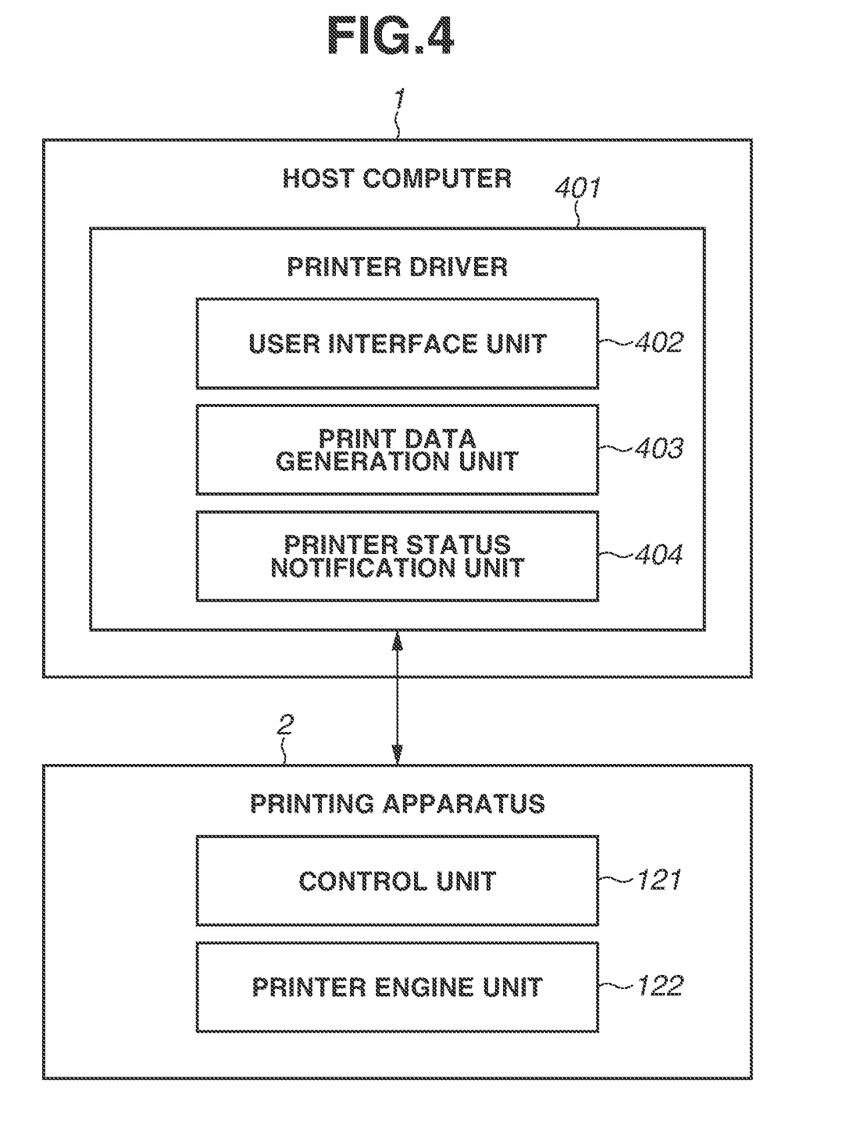
FIG. 4 is a diagram illustrating a software configuration of the system.

FIG. 4 is a diagram illustrating a software configuration of the system according to the present exemplary embodiment. The host 1 includes a printer driver 401, and the printer driver 401 includes a user interface unit 402, a print data generation unit 403, and a printer status notification unit 404.

The user interface unit 402 holds a functional unit of providing, to the user, a print setting screen for input of print setting of the printer driver 401. The printer driver 401 displays the print setting screen on the display 107 based on an instruction to display the print setting screen from the operating system. The user interface unit 402 internally holds information about the functions of the printer 2 (e.g., print capability including information about sheet size printable by printer and information indicating availability of double-side printing). Further, the user interface unit 402 displays the print setting screen based on the information about the functions of the printer 2.

The print data generation unit 403 holds a functional unit of generating print data to be transmitted as a print job to the printer 2. The print data generation unit 403 converts drawing data generated by the user into data in a data format interpretable by the printer 2 by using a drawing application program based on print setting set with the user interface unit 402. Further, the print data generation unit 403 generates a control command to control the printer 2.

The printer status notification unit 404 includes a functional unit of acquiring status information, such as a printing state and an error occurrence state, in the printer 2 via the bidirectional interface 3, and displays the information on the display 107. In the present exemplary embodiment, the print job includes generated print data and print setting, and is transmitted to the printer 2. The print setting further includes authentication information. For example, the print setting includes personal identification number (PIN) described below.

The printer 2 includes the control unit 121 and the printer engine unit 122. Functions of the units have been described above in conjunction with FIG. 1.

A PIN authentication function will be described. The PIN authentication function (authentication processing) is a function of preventing, through PIN authentication, a printed document from being carried away by a third party or from being lost. In the PIN authentication function, when the user makes, from the PC, print setting of the printer by using the printer driver installed in the PC, the user sets (specifies) an optional PIN to be embedded in the print job. Next, the printer that has received the print job temporarily suspends printing of the print job, and holds the print job inside the printer. Printing of the print job is started only in a case where the user instructs printing (output) of the print job on the printer and inputs the PIN, and the input PIN matches the PIN set at print setting of the print job. This makes it possible to prevent the printed document from being carried away by a third party and from being lost. In such a form, however, in a case of printing which requires a time, as in large-format printing, if the user moves away from the printer during printing even though the printer receives input of the PIN before start of the printing, possibility that the printed document is fraudulently carried away by a third party or is lost remains. Therefore, the user cannot move away from the printer until the printing is completed, which degrades usability. Even if a mechanism in which a discharge tray of the printer is locked and can be unlocked only by the user performing the print instruction is provided, large-scale hardware extension is necessary for the printer itself.

Thus, in the present exemplary embodiment, after printing of a print job in which the PIN is specified is completed and before the printer cuts the print medium, input of the PIN is received again. Only in a case where the PIN input by the user matches the PIN specified to the print job, the printer cuts the print medium. Thus, even if the user moves away from the printer during printing which requires a time such as large-format printing, it is possible to prevent the printed document printed by the printer from being fraudulently carried away by a third party or from being lost. Further, large-scale hardware extension is unnecessary for the printer itself. This makes it possible to improve usability.

The present exemplary embodiment will be described in detail with reference to FIG. 5 to FIG. 13.

Figure 5:
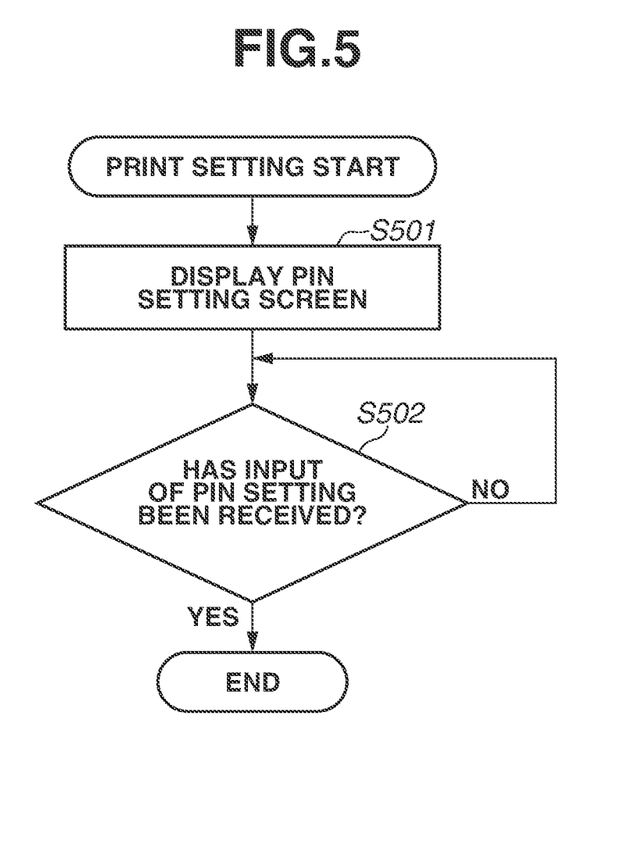
FIG. 5 is a flowchart of print setting.

FIG. 5 is a flowchart illustrating processing by the printer driver 401 that performs PIN authentication function in the user interface unit 402. For example, in a case where the user presses a predetermined icon in the print setting screen (not illustrated), the CPU 101 starts the processing in the flowchart based on the programs of the printer driver 401.

In step S501, the CPU 101 displays a PIN setting screen. The details will be described below with reference to FIG. 6 and FIG. 7.

Figure 6:
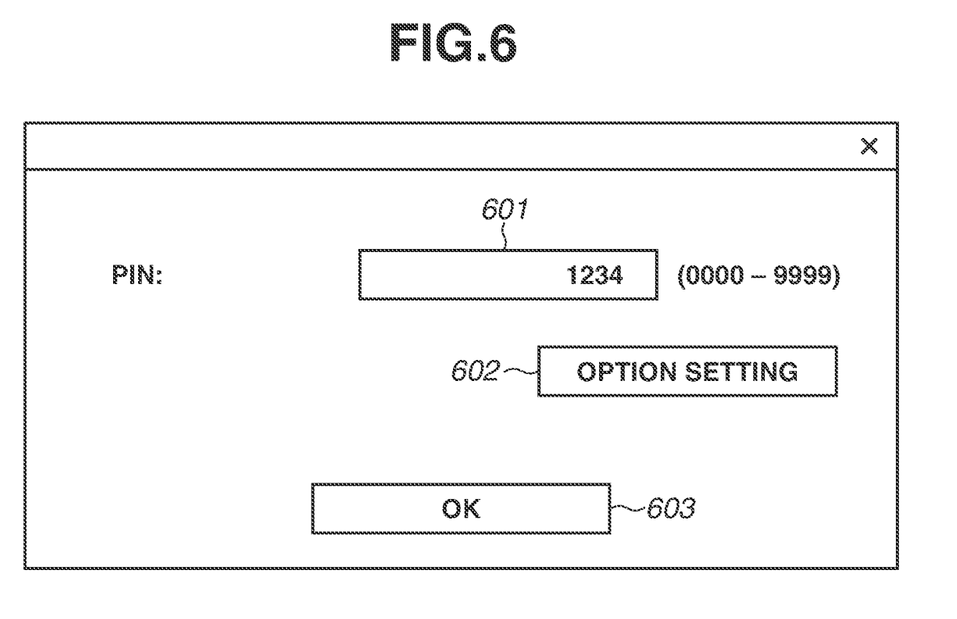
FIG. 6 is a diagram illustrating an example of a print setting screen for specifying authentication information to a print job.

In step S502, the CPU 101 determines whether input of a PIN has been received by a control portion 601 of the PIN setting screen in FIG. 6. For example, in a case where the user inputs a PIN in the control portion 601 of the screen in FIG. 6 and then presses an OK button 603, the CPU 101 determines that input of the PIN has been received. If a determination result in step S502 is YES (YES in step S502), the processing in the flowchart ends. If the determination result in step S502 is NO (NO in step S502), the processing in step S502 is performed.

FIG. 6 illustrates an example of the PIN setting screen displayed in step S501. The PIN setting screen includes the control portion 601 for setting a PIN to be set to a print job. The user sets any PIN to the print job through the control portion 601. For example, in a case where the user sets a PIN "1234", the user inputs "1234" to the control portion 601, and presses the OK button 603. As a result, the PIN "1234" is set to the print job. Further, in the PIN setting screen, option setting relating to the PIN authentication function is settable. When the user presses an option setting button 602, an option setting screen illustrated in FIG. 7 is displayed.

Figure 7:
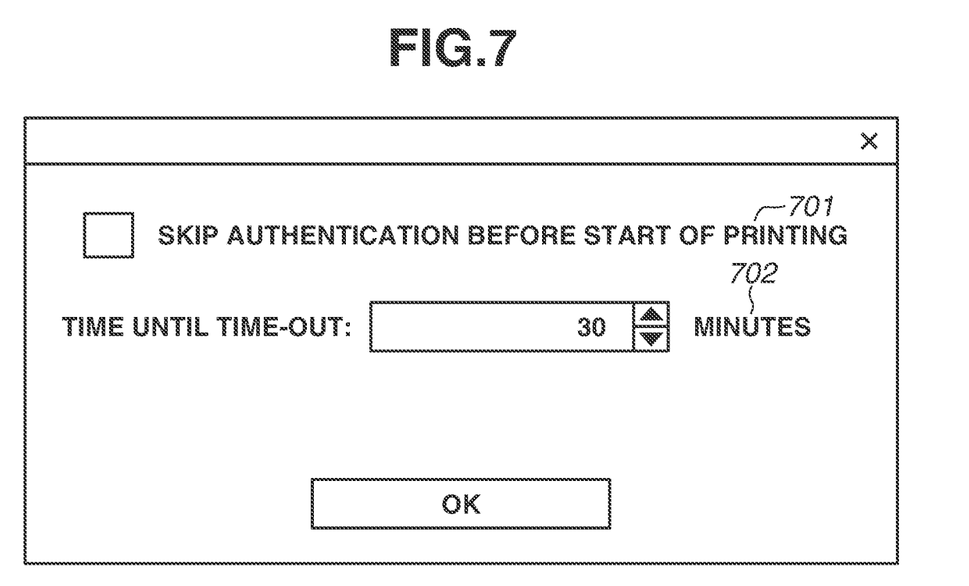
FIG. 7 is a diagram illustrating an example of a print setting screen for specifying option setting to a print job.

FIG. 7 illustrates an example of a setting screen of the option setting relating to the PIN authentication function, displayed when the user presses the option setting button 602 in FIG. 6. The screen includes a setting portion 701 for selecting whether not to use (to skip) the PIN authentication function before start of printing of a print job. For example, in a case where the user does not use the PIN authentication function before start of printing of the print job, the user checks a checkbox of the setting portion 701. In contrast, in a case where the user uses the PIN authentication function before start of printing of the print job, the user unchecks the checkbox of the setting portion 701. For example, in a case where the user unchecks the checkbox of the setting portion 701, the PIN authentication function is used before printing of the print job is started and before a print medium on which printing is completed is cut. Further, for example, in a case where the user checks the checkbox of the setting portion 701, the PIN authentication function is used only before the print medium on which printing is completed is cut. In other words, the setting portion 701 corresponds to setting whether to use the PIN authentication function only before the print medium on which printing is completed is cut. The user may end input of the PIN setting in the PIN setting screen by pressing the OK button 603 in FIG. 6 without performing the option setting.

The setting screen in FIG. 7 further includes a setting portion 702 for the user to set a time limit after the printer 2 that has received the print job in which the PIN is set starts printing of the print job until time-out. For example, a case where a PIN is not input by the user even when the set time limit until time-out has elapsed after start of printing of the print job, will be described. In this case, if a print job is registered in a standby queue, which will be described below with reference to FIG. 8, the print medium on which the print job is printed is cut even when the PIN is not input by the user. In other words, in the setting portion 702 in FIG. 7, the user can set the time limit until time-out of reception of the PIN input before the print medium on which printing is completed is cut. In a case where the user does not set the time limit until time-out in the setting portion 702, a default set value is adopted; however, the configuration is not limited thereto. For example, the print medium may not be cut until input of the PIN by the user is received, without exception. When an OK button in FIG. 7 is pressed, option in the PIN setting is set, and the screen returns to the PIN setting screen in FIG. 6.

Figure 8:
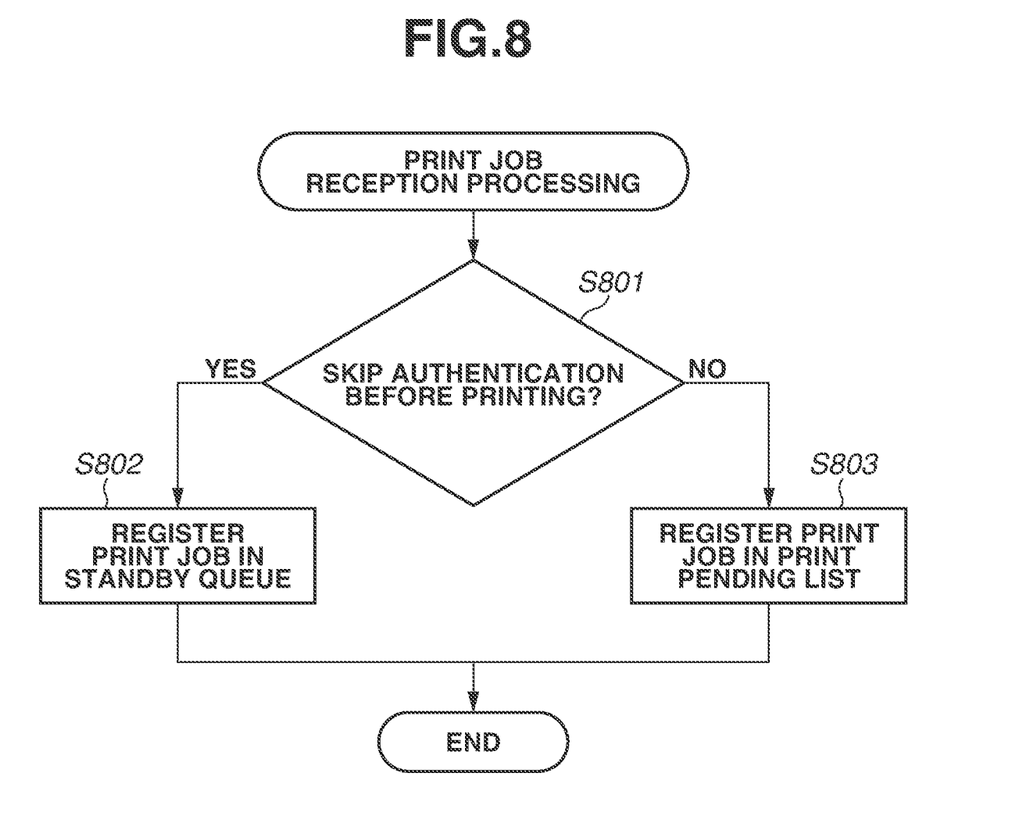
FIG. 8 is a flowchart illustrating print job reception processing which is performed by the printing apparatus.

FIG. 8 is a flowchart illustrating an example of processing by the printer 2 after a print job is received until printing is performed by the control unit 121. For example, in a case where a print job is received from the printer driver 401, the CPU 124 starts the processing in the flowchart.

In step S801, the CPU 124 determines whether the received print job does not use (skips) the PIN authentication function before start of printing of the print job. This is based on the checkbox of the setting portion 701 for selecting whether not to use the PIN authentication function in FIG. 7, provided in the option setting relating to the PIN authentication function in FIG. 6. If a determination result in step S801 is YES (checkbox of setting portion 701 is checked, YES in step S801), the processing proceeds to step S802. If the determination result in step S801 is NO (checkbox of setting portion 701 is unchecked, NO in step S801), the processing proceeds to step S803. In a case where the PIN authentication function before the print medium on which printing is completed is cut is not used, it is regarded that the PIN authentication function before start of printing of the print job is not used, and the processing proceeds to step S802.

In step S802, the CPU 124 registers the received print job in the standby queue. In other words, in a case where the PIN authentication function before start of printing of the print job is not used, the print job is registered in the standby queue. Here, the standby queue (first print job list) is a list of print jobs received by the printer 2. In a case where the printer 2 can perform printing, the print jobs registered in the standby queue are printed in a registration order.

Figure 9:
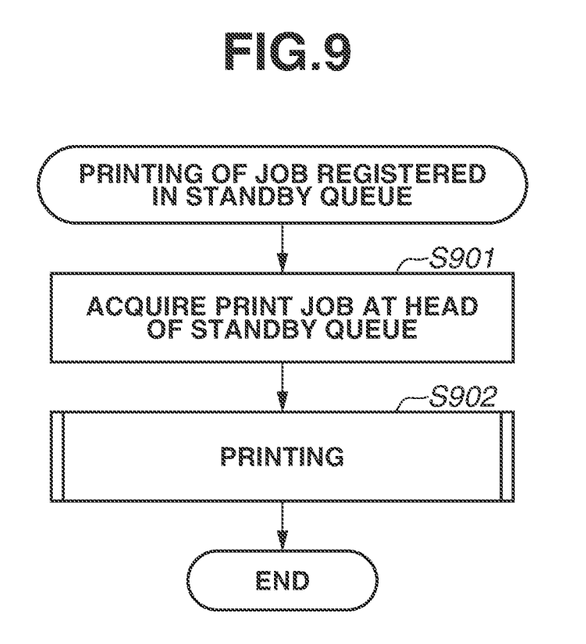
FIG. 9 is a flowchart illustrating processing of printing a job registered in a standby queue, which is performed by the printing apparatus.

FIG. 9 is a flowchart illustrating processing of printing the job registered in the standby queue by the printer 2 according to the present exemplary embodiment. For example, in a case where no print job is registered in the standby queue, the CPU 124 starts the processing in the flowchart in response to receiving a print job from the printer driver 401. Further, for example, in a case where a print job has been already registered in the standby queue, the CPU 124 starts the processing in the flowchart if the CPU 124 determines that a print job is present in the standby queue (not illustrated).

In step S901, the CPU 124 acquires a print job at a head (early in registration order) of the standby queue among the print jobs registered in the standby queue.

In step S902, the CPU 124 prints the print job acquired in step S901. The details thereof will be described below with reference to FIG. 11.

Referring back to FIG. 8, in step S803, the CPU 124 registers the received print job in a print pending list. In other words, in a case where the PIN authentication function before start of printing of the print job is used, the print job is registered in the print pending list (second print job list). The print pending list is a list of print jobs received by the printer 2. In a case where the user selects the print job from the print pending list and operates (instructs) print start on the operation panel 12 of the printer 2, printing of the print job is started.

Figure 10:
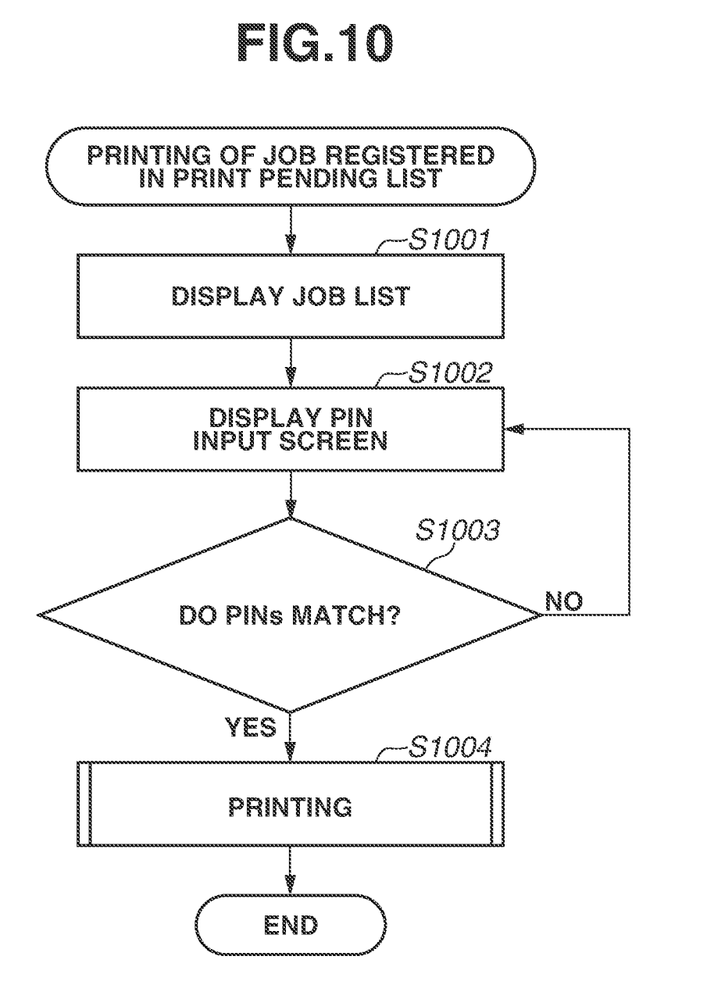
FIG. 10 is a flowchart illustrating processing of printing a job registered in a print pending list, which is performed by the printing apparatus.

FIG. 10 is a flowchart illustrating processing of printing a job registered in the print pending list by the printer 2 according to the present exemplary embodiment. For example, in a case where the user performs (instructs) operation to open the print pending list on the operation panel 12 of the printer 2, the CPU 124 starts the processing in the flowchart.

In step S1001, the CPU 124 displays a list of print jobs registered in the print pending list, on the operation panel 12.

Figure 12:
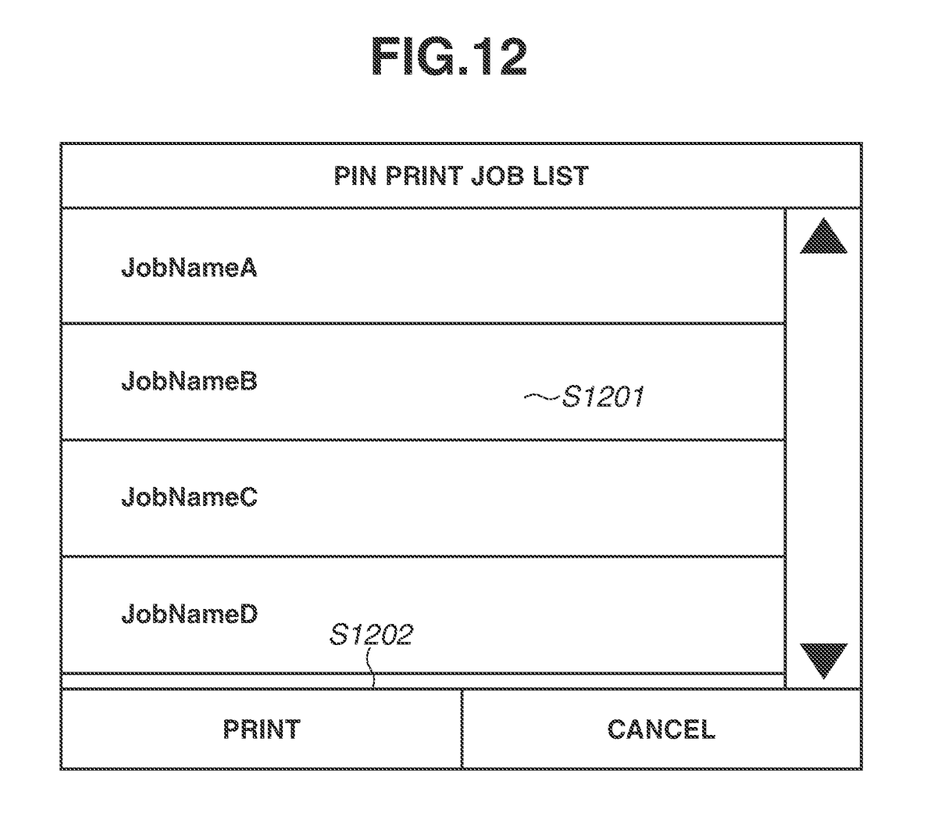
FIG. 12 illustrates an example of an operation panel screen displaying a print pending job list.

FIG. 12 illustrates an example of an operation panel screen displaying the print pending job list displayed in step S1001 of FIG. 10. The user can select an optional print job to be printed, from a print pending job list 1201, on the operation panel 12 of the printer 2. When the user presses a print button 1202, the processing proceeds to step S1002 in FIG. 10.

When a cancel button in FIG. 12 is pressed, the screen returns to, for example, a home screen of the operation panel 12 of the printer 2 (not illustrated).

Figure 13:
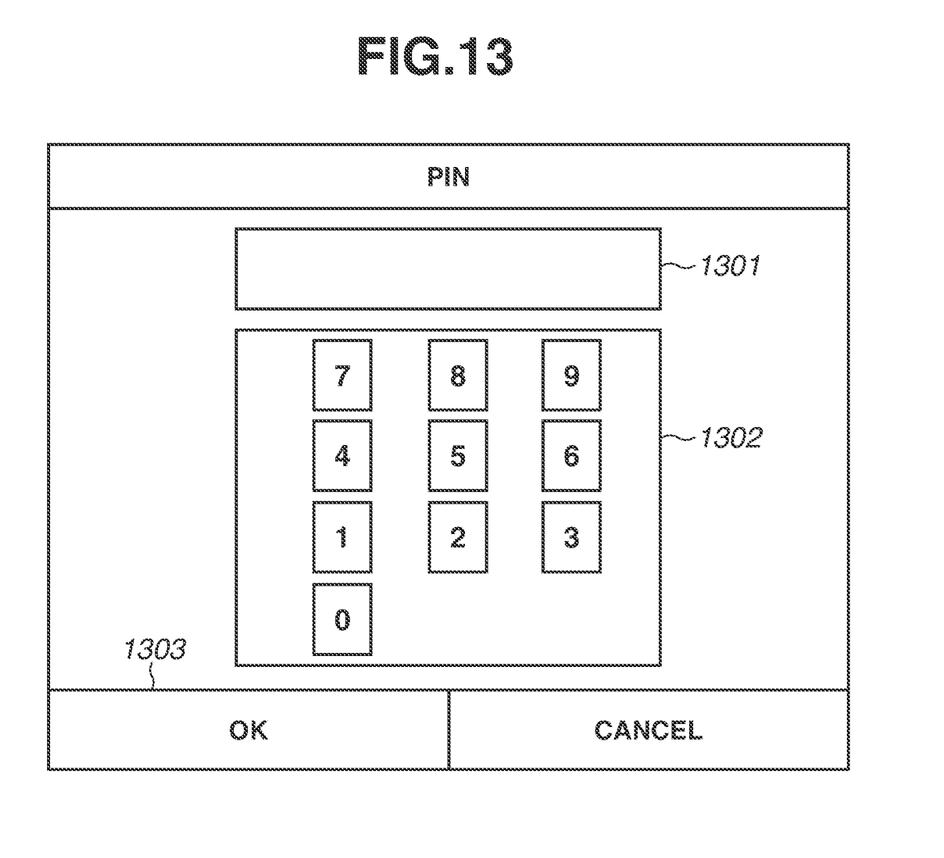
FIG. 13 illustrates an example of an operation panel screen for inputting a personal identification number (PIN).

FIG. 13 illustrates an example of an operation panel screen for inputting a PIN of a print job, displayed in step S1002 of FIG. 10. For example, when the user presses the print button 1202 in FIG. 12, the screen is displayed. The user can input any values in a field 1301 used for input of the PIN by using a numerical keypad 1302. For example, in a case where the user has specifies the PIN "1234" for the print job selected from the print pending job list 1201 in step S1001, in the PIN setting screen of the printer driver 401, the user inputs "1234" in the field 1301. When the user presses an OK button 1303, the processing proceeds to step S1003 in FIG. 10. When the user presses a cancel button in FIG. 13, the screen returns to, for example, the print pending job list.

In step S1003, the CPU 124 collates the PIN set to the print job selected from the print pending job list 1201 in step S1001 with the PIN input in the field 1301 in step S1002. In a case where the PINs match (YES in step S1003), the processing proceeds to step S1004. In a case where the PINs do not match (NO in step S1003), the processing returns to step S1002. In step S1004, the CPU 124 starts printing of the print job selected from the print pending job list 1201. The details thereof will be described below with reference to FIG. 11.

Figure 11:
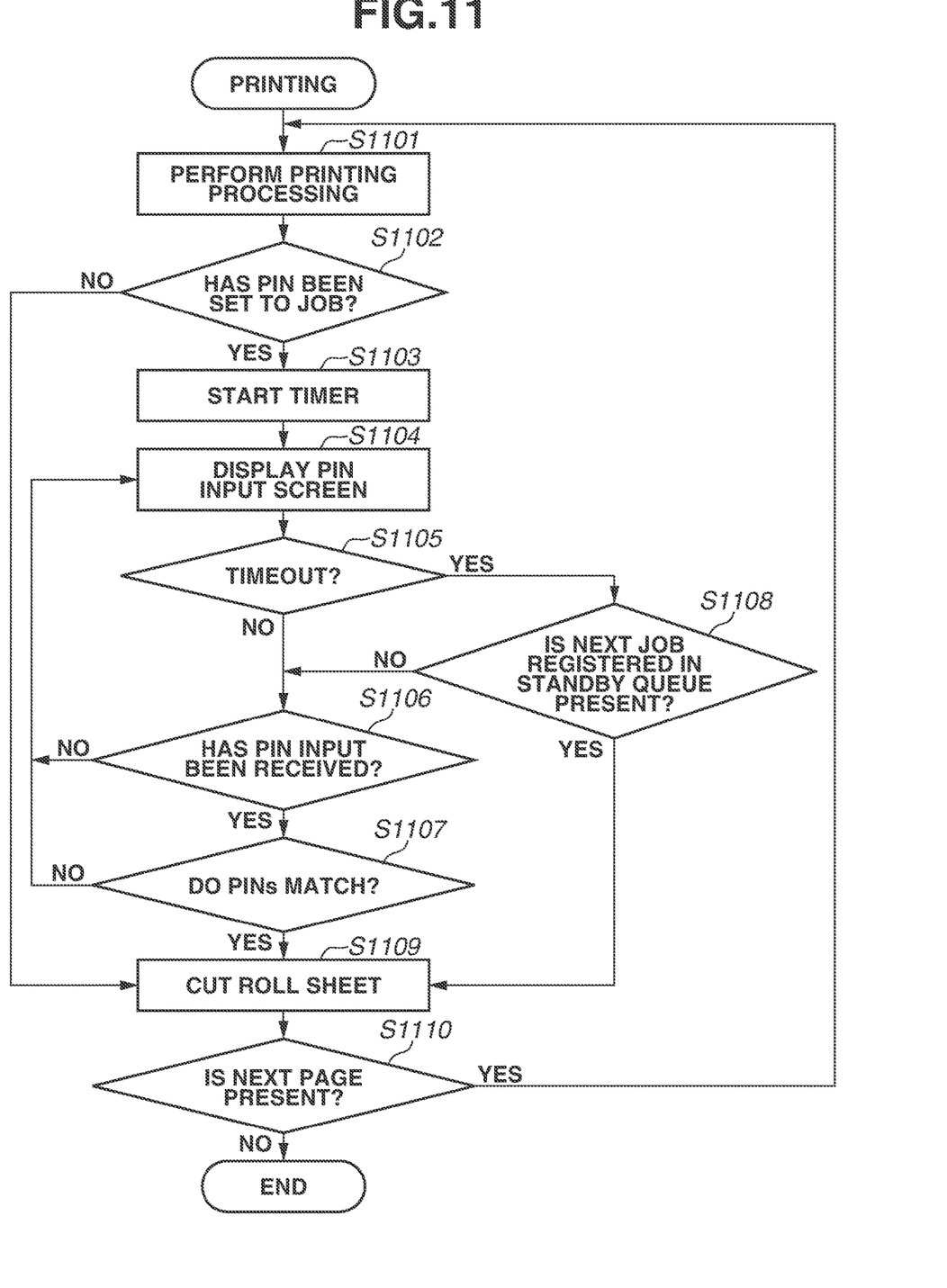
FIG. 11 is a flowchart illustrating details of printing processing.

FIG. 11 is a flowchart illustrating an example of processing by the printer 2 after printing is started until the printed print medium is cut and the user can take out the printed document. FIG. 11 is the flowchart illustrating the details of the processing in step S902 in the flowchart of FIG. 9 and the processing in step S1004 in the flowchart of FIG. 10.

In step S1101, the CPU 124 performs printing processing page by page from a head page of the print job.

In step S1102, the CPU 124 determines whether the PIN has been set to the print job. If a determination result in step S1102 is YES (YES in step S1102), the processing proceeds to step S1103. If the determination result in step S1102 is NO (NO in step S1102), the processing proceeds to step S1109. A case where the PIN has not been set to the print job (NO in step S1102) corresponds to a case where a print job in which the PIN has not been set by the printer driver 401. In other words, in this case, the PIN authentication function before the print medium on which printing is completed is cut is not used and the PIN authentication function before start of printing of the print job is not used.

In step S1103, the CPU 124 starts a timer in order to count the elapsed time thereafter. For example, the CPU 124 starts the timer in order to determine, in the following flow, whether a time limit until time-out of reception of the PIN input before the print medium on which printing is completed is cut, set in the setting portion 702 in FIG. 7 has elapsed. The timer is started immediately before the operation panel screen to input the PIN of the print job displayed in step S1104 (described below) is displayed. However, the timer may be started immediately after the operation panel screen for inputting the PIN of the print job displayed in step S1104 is displayed. In other words, the order of steps S1103 and S1104 does not matter. In a case where the operation panel screen for inputting the PIN of the print job is displayed after start of printing of one optional page in the print job or after completion of the printing, the timer may also be started after start of printing of one optional page in the print job or after completion of the printing. The timer may be started at any other timing.

In step S1104, the CPU 124 displays the operation panel screen for inputting the PIN of the print job, and receives input of the PIN. For example, to receive input of the PIN, the above-described screen in FIG. 13 is displayed on the operation panel 12 of the printer 2. The user can input the PIN in the field 1301 of the screen in FIG. 13 displayed on the operation panel 12 of the printer 2.

The screen in FIG. 13 for receiving input of the PIN may be displayed after start of printing of one optional page in the print job or after completion of the printing.

In step S1105, the CPU 124 determines whether the time counted by the timer started in step S1103 has reached the time limit until time-out of reception of the PIN input before the print medium on which printing is completed is cut (whether reception of the PIN input has timed out). If a determination result in step S1105 is YES (YES in step S1105), the processing proceeds to step S1108. If the determination result in step S1105 is NO (NO in step S1105), the processing proceeds to step S1106. When reception of the PIN input is timed out, the displayed screen is returned from the screen in FIG. 13 to the home screen of the operation panel 12 of the printer 2; however other forms may be applicable, for example, a from in which a screen with which time-out is recognizable may be displayed on the operation panel 12.

In step S1106, the CPU 124 determines whether input of the PIN has been received. For example, in a case where the user inputs the PIN in the field 1301 of the screen in FIG. 13 displayed on the operation panel 12 and presses the OK button 1303, the CPU 124 determines that input of the PIN has been received. If a determination result in step S1106 is YES (YES in step S1106), the processing proceeds to step S1107. If the determination result in step S1106 is NO (NO in step S1106), the processing returns to step S1104, and the screen for inputting of the PIN is displayed again.

In step S1107, the CPU 124 determines whether the PIN input in the field 1301 of the operation panel screen in FIG. 13 by the user in step S1106 and the PIN set to the print job under printing match each other. The PIN set to the print job under printing is the PIN input by the user in the control portion 601 in FIG. 6. If a determination result in step S1107 is YES (YES in step S1107), the processing proceeds to step S1109. If the determination result in step S1107 is NO (NO in step S1107), the processing returns to step S1104, and the screen for inputting of the PIN is displayed again.

If reception of the PIN input is timed out in step S1105 (YES in step S1105), the CPU 124 determines in step S1108 whether a next print job (waiting for printing) has been registered in the standby queue. If a determination result in step S1108 is YES (YES in step S1108), the processing proceeds to step S1109. If the determination result in step S1108 is NO (NO in step S1108), the processing proceeds to step S1106, and the CPU 124 determines whether input of the PIN has been received.

If the above-described PINs match in step S1107, the CPU 124 instructs the printer engine unit 122 to cut the print medium in step S1109. For example, after completion of printing of one optional page in the print job, printing of which is started in step S1101, the print medium is cut in order to be taken out from the printer 2. More specifically, in the schematic diagram in FIG. 3 illustrating a sheet conveyance position immediately after printing of a first page is completed, the cutter unit 202 cuts the print medium 201 at the cutter position f while moving from the right side to the left side in FIG. 3. If it is determined in step S1108 that the print job registered in the standby queue is present (YES in step S1108), the CPU 124 instructs the printer engine unit 122 to cut the print medium. This is performed in a case where the PIN is not input by the user even though the set time limit until time-out has elapsed after printing of one optional page in the print job is started, and a next print job (waiting for printing) is registered in the standby queue. In this case, even when the PIN is not input by the user, the print medium on which the print job is printed is cut. This makes it possible to reduce accumulation of the other print jobs not yet printed.

In step S1110, the CPU 124 determines whether any pages which have not been printed are present in the print job under processing. If a determination result in step S1110 is YES (YES in step S1110), the processing returns to step S1101, and printing is repeated for remaining pages in the print job. If the determination result in step S1110 is NO (NO in step S1110), the processing in the flowchart ends. After the processing in the flowchart ends, in a case where a print job is registered in the standby queue, the processing in the flowchart is sequentially performed on the print job registered in the standby queue and the print job is printed even without a print instruction from the user. Even in a case where the print jobs registered in the standby queue are sequentially printed, the operation panel 12 of the printer 2 is operable, and the user can select a print job from the print pending list and perform operation (instruction) to start printing. In this case, after completion of printing of the print job registered in the standby queue, under printing at that time, printing of the print job selected from the print pending list is started.

As described above, in the present exemplary embodiment, input of the PIN is received before the print medium on which printing is completed is cut, and the print medium is cut only in a case where the PIN received from the user matches the PIN specified in the PIN setting by the printer driver. Accordingly, even in a case of printing which requires a time as in large-format printing, it is possible to prevent the printed document from being carried away by a third party or from being lost. This enables the user to move away from the printer, thus improving usability. In the present exemplary embodiment, large-scale hardware extension is unnecessary for the printer itself, thus mitigating issues such as mechanical failure risk and increase in cost of parts. Since the time limit until time-out of reception of the PIN input before the print medium on which printing is completed is cut is set, it is possible to reduce accumulation of the other print jobs not yet printed. Further, in the present exemplary embodiment, it is possible to set whether to use the PIN authentication function before start of printing of a print job. This makes it possible to reduce time and effort of the user caused by input of the PIN again before the print medium on which printing is completed is cut. The authentication information according to the present exemplary embodiment may be a password or other authentication information without being limited to the PIN.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-086092, filed May 21, 2021, which is hereby incorporated by reference herein in its entirety.

What is claimed is:

1. A printing apparatus, comprising:
a data reception unit configured to receive print data and authentication information from an information processing apparatus outside the printing apparatus;
an input reception unit configured to receive input of the authentication information from a user;
a printing unit configured to perform printing based on the print data; and
a control unit configured to control a cut unit configured to cut a print medium,
wherein the printing unit performs predetermined printing based on the print data, based on received authentication information and the input authentication information, and
wherein the control unit causes the cut unit to cut the print medium including a portion where the predetermined printing has been performed, based on received authentication information and the authentication information input after start of the predetermined printing.

2. The printing apparatus according to claim 1, wherein the print medium is a roll sheet.

3. The printing apparatus according to claim 1, wherein the control unit causes the cut unit to cut the print medium, on an upstream side in a conveyance direction, including a portion where the printing based on the print data has been performed.

4. The printing apparatus according to claim 1, further comprising a determination unit configured to determine whether a print job including the print data and the authentication information is a print job for which the authentication information is to be input to the printing apparatus before start of printing of the print job.

5. The printing apparatus according to claim 4,
wherein, in a case where the determination unit determines that the received print job is the print job for which the authentication information is to be input to the printing apparatus before start of printing of the print job, the print job is registered in a first print job list, and
wherein, in a case where the determination unit determines that the received print job is not the print job for which the authentication information is to be input to the printing apparatus before start of printing of the print job, the print job is registered in a second print job list different from the first print job list.

6. The printing apparatus according to claim 5,
wherein the first print job list is a list of print jobs, printing of which is started in a registration order without a print instruction being received from the user, and
wherein the second print job list is a list of print jobs, printing of which is started in a case where a print start instruction is received from the user.

7. The printing apparatus according to claim 1, further comprising:
a first determination unit configured to acquire a time limit set to a print job including the print data, and determine whether the acquired time limit has passed; and
a second determination unit configured to determine, in a case where the first determination unit determines that the time limit has passed, whether the printing unit has received the print data having a setting with which the predetermined printing is not performed,
wherein, in a case where the second determination unit determines that the printing unit has received the print data having the setting, even in a case where the input reception unit has not received input of the authentication information to the printing apparatus, the control unit causes the cut unit to cut the print medium including a portion where the printing based on the print data has been performed.

8. The printing apparatus according to claim 7, wherein, in a case where the second determination unit determines that the printing unit has not received the print data having the setting, the input reception unit again displays a screen for receiving input of the authentication information to the printing apparatus.

9. The printing apparatus according to claim 1,
wherein, in a case where a first setting with which the predetermined printing is performed by the printing unit is set, the printing unit performs the predetermined printing, and the control unit causes the cut unit to cut the print medium including the portion where the predetermined printing has been performed, based on received authentication information and the authentication information input after start of the predetermined printing, and
wherein, in a case where a second setting with which the predetermined printing is not performed by the printing unit is set, the printing unit performs the printing based on the print data without performing the predetermined printing, and the control unit causes the cut unit to cut the print medium including a portion where the printing based on the print data has been performed, based on received authentication information and the authentication information input after start of the predetermined printing.

* * * * *